United States Patent
Seo et al.

(10) Patent No.: US 8,750,349 B2
(45) Date of Patent: Jun. 10, 2014

(54) RELAY AND DATA RELAY METHOD

(75) Inventors: Han-Byul Seo, Anyang (KR); Youngtae Kim, Seoul (KR); Inkyu Lee, Seoul (KR); Changick Song, Seoul (KR); Kyoungjae Lee, Seoul (KR)

(73) Assignees: LG Electronics Inc., Seoul (KR); Korea University Research and Business Foundation, Seoul (KR)

( * ) Notice: Subject to any disclaimer, the term of this patent is extended or adjusted under 35 U.S.C. 154(b) by 115 days.

(21) Appl. No.: 13/498,868

(22) PCT Filed: Sep. 17, 2010

(86) PCT No.: PCT/KR2010/006443
§ 371 (c)(1),
(2), (4) Date: Mar. 28, 2012

(87) PCT Pub. No.: WO2011/040726
PCT Pub. Date: Apr. 7, 2011

(65) Prior Publication Data
US 2012/0189037 A1    Jul. 26, 2012

(30) Foreign Application Priority Data

Sep. 29, 2009 (KR) .................. 10-2009-0092688
Nov. 10, 2009 (KR) .................. 10-2009-0108224

(51) Int. Cl.
*H04B 3/36* (2006.01)
(52) U.S. Cl.
USPC ............... 375/211; 375/219; 455/15; 455/7; 455/296
(58) Field of Classification Search
USPC ..................... 375/211, 219; 455/15, 7, 296
See application file for complete search history.

(56) References Cited

U.S. PATENT DOCUMENTS

| | | | |
|---|---|---|---|
| 2008/0165734 A1* | 7/2008 | Hart et al. | 370/330 |
| 2010/0062708 A1* | 3/2010 | Sangiamwong et al. | 455/24 |
| 2010/0272005 A1* | 10/2010 | Larsson et al. | 370/315 |

OTHER PUBLICATIONS

Lee et al., "Sum-Rate Maximization for Two-Way MIMO Amplify-and-Forward Relaying Systems", 2009 IEEE 69th Vehicular Technology Conference, pp. 1-5, Apr. 29, 2009.
Roemer et al., "Tensor-Based Channel Estimation (TENCE) for Two-Way Relaying With Multiple Antennas and Spatial Reuse", 2009 IEEE International Conference on Acoustics, Speech and Signal Processing, pp. 3641-3644, Apr. 24, 2009.
Unger et al., "On the Performance of Two-Way Relaying with Multiple-Antenna Relay Stations", 2007 16th Mobile and Wireless Communications Summit, pp. 1-5, Jul. 5, 2007.
Weng et al., "Multi-user MIMO Relay System with Self-interference Cancellation", 2007 IEEE Wireless Communications and Networking Conference, pp. 959-963, Mar. 15, 2007.

* cited by examiner

*Primary Examiner* — Zewdu Kassa
(74) *Attorney, Agent, or Firm* — Birch, Stewart, Kolasch & Birch, LLP

(57) ABSTRACT

Disclosed is a relay. The relay includes: a reception unit configured to receive signals from a transmitter; a processor configured to estimate a channel with respect to the transmitter based on a pilot signal of the transmitter among receiving signals, remove the pilot signal from among the received signals, amplify the signals without the pilot signal according to the estimated channel, and insert a pilot signal of the relay into the amplified signals; and a transmitter transmitting the signals including the pilot signal of the relay under the control of the processor.

9 Claims, 11 Drawing Sheets

RELAY AND DATA RELAY METHOD

TECHNICAL FIELD

The present invention relates to a relay and a data relay method.

BACKGROUND ART

In a general cellular network, communication is performed through a direct link between a base station and a terminal within a cell covered by the base station. However, a communication network tends to increasingly have a higher frequency band and radius of cells tend to reduced to accommodate high speed communication and increasing traffic. Thus, operating a cellular wireless network scheme as it is through a direct link involves a great deal of problems.

Thus, in order to solve such problems, a relay system which is distributedly controlled and established and able to actively cope with a change in an environment such as addition of a new base station has been proposed in a next-generation communication system.

A relay system extends cell service coverage by covering a partial shadow area in a cell region, increase a system capacity, and reduce a burden of initial installation cost by using relaying in an initial situation in which there is not many service requests.

FIG. 1 shows a conventional relay system.

As shown in FIG. 1, one or more terminals 11, 12, 13 exist in a region of a base station 20.

In this case, one or more of the terminals 11, 12, 13 may operate as a relay (or relaying). A terminal operating as a relay has a good channel environment and a high channel gain on average.

Namely, when the terminal that has a good channel environment operates as a relay, the other terminals that do not have such a good channel environment may transmit and receive data to and from the base station through the terminal operating as a relay.

The method of utilizing a terminal as a relay in a cellular system can improve transmission performance. Namely, the terminal, which serves as a relay to allow the other terminals existing within the base station coverage to stably communicate with the base station, amplifies a data signal and transfers the amplified data signal to each reception end, thus improving transmission performance.

Meanwhile, there are two types of schemes for each relay to relay a signal. Namely, an amplify and forward (AF) scheme and a decode and forward (DF) scheme exist.

In the case of the DF scheme, a relay decodes a signal received from a transmitter, re-encodes it to generate a message signal, and transmits the message signal to the receiver. However, in the DF scheme, since the relay decodes the message signal of the transmitter, re-encodes the message signal, and then, transmits the signal, noise influence is less made but hardware complexity is increased due to decoding of the message signal of the transmitter.

In the AF scheme, the relay amplifies a message signal received from a transmitter to have a predetermined size and re-transmits the amplified signal. The AF scheme does not perform signal processing for decoding, simple hardware can be implemented. However, since noise added in the relay is transferred to a receiver, performance is degraded in an environment having a low signal-to-noise ratio.

Compared with the DF scheme, the AF scheme advantageously has low complexity and processing delay in an actual implementation, and thus, recently, the AF scheme is more actively studied.

However, according to the AF scheme as mentioned above, in order to decode the signal received from the relay station, the receiver should estimate a channel between the receiver and the relay and also should know a channel between the transmitter and the relay.

Meanwhile, a relay scheme of the relay station includes a two-way relay scheme and a one-way relay scheme.

The two-way relay scheme allows the relay to perform two-way communication with the base station and the terminal simultaneously, so it can remarkably improve a channel capacity in comparison to the one-way relay scheme.

When the two-way relay technique is applied in an SISO (Single-Input Single-Output) manner to the relay, the relay may only need to simply amplify and forward (AF) the received signal.

However, unlike the SISO scheme, when the two-way relay scheme based on MIMO (Multiple Input Multiple Output) is applied to the two-way relay scheme, the relay station can enhance spectrum efficiency relay data at a high speed by using a plurality of antennas.

In the MIMO type two-way relay scheme, the relay should filter received multiple signals to configure multiple outputs, so filter design of the relay station acts as an important factor of system performance. In other words, DF (decode and forward) should be performed, and in this case, filter design works as an important factor of a system.

Also, the base station and the terminal require a storage medium capable of storing a signal transmitted by them, respectively, and when a signal, which is transmitted by the base station and the terminal, rather than a target reception signal is returned in a channel, the signal acts as a self-interference signal. Thus, accurate information regarding a channel associated with the self-interference signal is required and a function of removing self-interference based on the information is required.

However, in the case of the terminal, due to a hardware limitation such as battery performance and size, the terminal may not have a self-interference removal function, and also, in this case, a filter design of the relay station is further important.

When the AF scheme of the conventional art as described above is used, the receiver should know a channel between the transmitter and the relay, as well as a channel of the relay, but this accompanies a great amount of technical difficulties in actuality.

Thus, in order to enable the receiver to estimate a channel between the transmitter and the relay, a scheme of allowing the transmitter and the relay to use a subcarrier and a pilot signal, respectively, has been proposed.

However, the scheme of allowing the transmitter and the relay to use a subcarrier and a pilot signal, respectively, is greatly ineffective in terms of channel and causes a waste of radio resource.

DISCLOSURE OF THE INVENTION

Therefore, an object of the present invention is to enable a receiver to estimate only a channel between the receiver and a relay in an amplify and forward (AF) scheme.

Another object of the present invention is to relay data of a terminal that does not have a self-interference removal function in a decode and forward (DF) scheme.

To achieve these and other advantages and in accordance with the purpose of the present invention, as embodied and broadly described herein, there is provided a relay according to a first embodiment. The relay includes: a reception unit configured to receive signals from a transmitter; a processor configured to estimate a channel with respect to the transmitter based on a pilot signal of the transmitter among receiving signals, remove the pilot signal from among the received signals, amplify the signals without the pilot signal according to the estimated channel, and insert a pilot signal of the relay into the amplified signals; and a transmitter configured to transmit the signals including the pilot signal of the relay under the control of the processor.

The position of the pilot signal of the transmitter and the position of the pilot signal of the relay may be the same. The position of the pilot signal of the transmitter and the position of the pilot signal of the relay may be different.

After removing the pilot signal of the transmitter from among the signals, the processor may shift a signal temporally subsequent to the pilot signal to the position of the pilot signal.

To achieve these and other advantages and in accordance with the purpose of the present invention, as embodied and broadly described herein, there is also provided a signal amplify and forward method of a relay according to the first embodiment. The signal amplify and forward method includes: receiving, by the relay, signals from a transmitter; estimating a channel with respect to the transmitter by using a pilot signal among the received signals; removing the pilot signal from the received signals; amplifying the signals without the pilot signal according to the estimated channel; and including a pilot signal of the relay in the amplified signals and transmitting the same.

To achieve these and other advantages and in accordance with the purpose of the present invention, as embodied and broadly described herein, there is also provided a data relay according to a second embodiment. The data relay in a multi-input multi-output (MIMO) type two-way relay system, includes: a reception unit configured to receive signals from a base station and a terminal; a signal processing unit configured to perform filtering on signals received from the reception unit such that a self-interference signal of the terminal is removed; and a transmitter configured to transfer the reception signals filtered to remove the self-interference signal of the terminal from the signal processing unit, to the base station and the terminal, wherein the signal processing unit includes a filter for making the self-interference signal channel of the terminal have a null value in the signals received from the reception unit.

To achieve these and other advantages and in accordance with the purpose of the present invention, as embodied and broadly described herein, there is also provided a data relay method according to the second embodiment. The data relay method of a relay station includes: receiving signals $S_A$ and $S_B$ transmitted from a base station and a terminal; processing the reception signals to relay them to the terminal and the base station; and relaying the processed reception signals to the base station and the terminal, wherein when a forward channel from the terminal to the relay station is G, a reverse channel from the terminal to the relay station is $\overline{G}$, a power adjustment constant of the relay station is $\gamma$, and a filter of the relay station is F, in the signal processing step, filtering is performed through the filter F such that a self-interference signal component $\gamma\overline{G}FGs_A$ of the terminal generated as the signal $S_A$ is received again by the terminal through the reverse channel $\overline{G}$ of the terminal and the relay station is removed.

MODES FOR CARRYING OUT THE PREFERRED EMBODIMENTS

Figure 1:
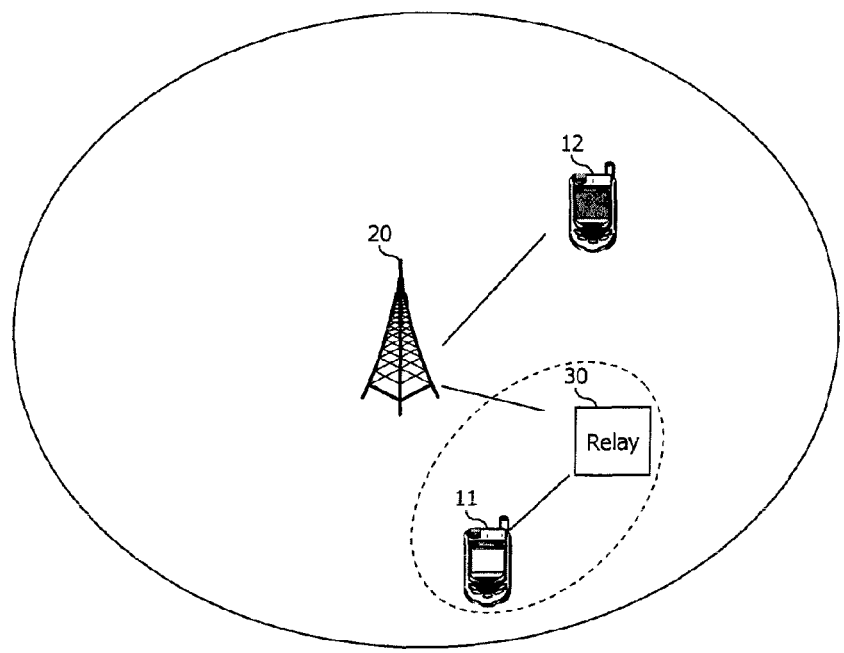
FIG. 1 is a drawing illustrating a conventional relay system.

Reference will now be made in detail to the preferred embodiments of the present invention, examples of which are illustrated in the accompanying drawings. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The present invention can be applied to every communication system, e.g., 3GPP (3rd Generation Partnership Project) LTE (Long Term Evolution), IEEE standard, and Ad-Hoc networks, to which a technical concept of the present invention can be applied.

The terminology used herein is for the purpose of describing particular embodiments only and is not intended to be limiting of the invention. Unless otherwise defined, all terms used herein have the same meaning as commonly understood by one of ordinary skill in the art to which this invention pertains, and should not be interpreted as having an excessively comprehensive meaning nor as having an excessively contracted meaning. If technical terms used herein is erroneous that fails to accurately express the technical idea of the present invention, it should be replaced with technical terms that allow the person in the art to properly understand. The general terms used herein should be interpreted according to the definitions in the dictionary or in the context and should not be interpreted as an excessively contracted meaning.

In the present application, it is to be understood that the terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

While terms such as "first" and "second," etc., may be used to describe various components, such components must not be understood as being limited to the above terms. The above terms are used only to distinguish one component from another. For example, a first component may be referred to as a second component without departing from the scope of rights of the present invention, and likewise a second component may be referred to as a first component. The term "and/or" encompasses both combinations of the plurality of related items disclosed and any item from among the plurality of related items disclosed.

When a component is mentioned as being "connected" to or "accessing" another component, this may mean that it is directly connected to or accessing the other component, but it is to be understood that another component may exist therebetween. On the other hand, when a component is mentioned as being "directly connected" to or "directly accessing" another component, it is to be understood that there are no other components in-between.

The exemplary embodiments of the present invention will now be described with reference to the accompanying drawings, in which like numbers refer to like elements throughout. In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings. The technical idea of the present invention should be interpreted to embrace all such alterations, modifications, and variations in addition to the accompanying drawings. Hereafter, a term of terminal is used, but the terminal may be called by other names such as SS (Subscriber Station), UE (User Equipment), ME (Mobile Equipment), or MS (Mobile Station). Also, the terminal may be a portable device having a communication function such as a mobile phone, a PDA, a smart phone, a notebook computer, and the like, or may be a device which is not portable and has a communication function such as a PC or a vehicle-mount device.

Figure 2:
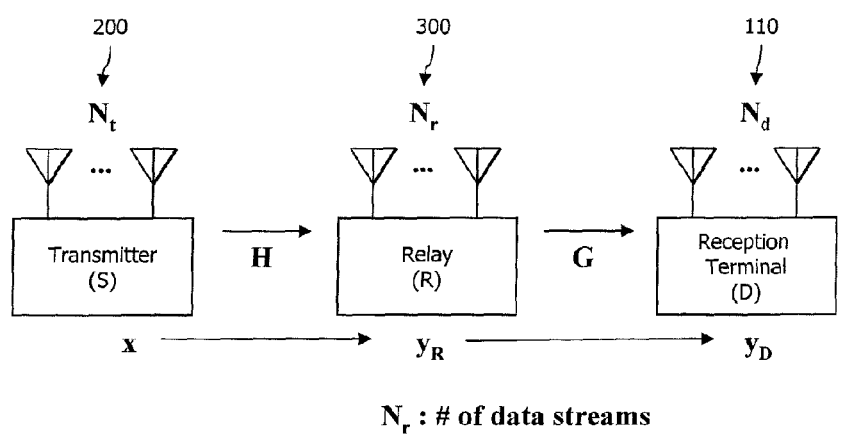
FIG. 2 is a drawing illustrating an amplify and forward (AF) scheme according to a first embodiment of the present invention in a MIMO-based system.

FIG. 2 is a drawing illustrating an amplify and forward (AF) scheme according to a first embodiment of the present invention in a MIMO-based system.

As can be seen with reference to FIG. 2, the MIMO-based system includes a transmitter 200, a relay 300, and a reception terminal 110.

The transmitter 200 is a source indicated by 'S', and the relay 300 is indicated by 'R', and the reception terminal, a destination, is indicated by D'.

The transmitter 200, the relay 300, and the reception terminal 110 have Nt number of antennas, Nr number of antennas, and Nd number of antennas, respectively.

A channel H exists between the transmitter 200 and the relay 300, and a channel G exists between the relay 300 and the reception terminal 110. For the channel H and the channel G, flat fading may be assumed based on OFDM (orthogonal frequency division multiplexing). Every element of the channel H and the channel G may be modeled by i.i.d. complex Gaussian random variable.

As shown in FIG. 2, communication between the transmitter 200 and the reception terminal 110 is relayed by one relay 300, and respective input and output may be represented by following Equation.

$$y_R = HFx + n_1$$

$$y_D = GQHFx + GQn_1 + n_2$$

$$y_D = W_D y_D = W_D GQHFx + W_D GQn_1 + WDn_2 \quad \text{[Equation 1]}$$

Here, F is a filter used in the transmitter 200, Q and $W_D$ correspond to linear filters used between the relay 300 and the reception terminal 110. And, n1 and n2 are noise.

Meanwhile, the reception terminal 110 optimized based on an MMSE optimization reference may be defined by following equation.

$$\hat{W}_D = \left( F^H H^H Q^H G^H R_n^{-1} GQHF + \frac{1}{\sigma_x^2} I \right)^{-1} F^H H^H Q^H G^H R_n^{-1} \quad \text{[Equation 2]}$$

$$\text{Here, } R_n = \sigma_{n_1}^2 GQQ^H G^H + \sigma_{n_2}^2 I$$

As can be seen from Equation 2, in case of an existing amplify and forward (AF) scheme, the reception terminal 110 should know both the effective channels GQHF and GQ.

When the reception terminal 110 uses the above $\hat{W}_D$, an error matrix is given as follows.

$$R_E = (F^H H^H Q^H G^H R_n^{-1} GQHF + \sigma_x^{-2} I)^{-1} \quad \text{[Equation 3]}$$

In the system illustrated in FIG. 2 as mentioned above, a channel estimation is made on the basis of a model illustrated in FIG. 2.

Figure 3:
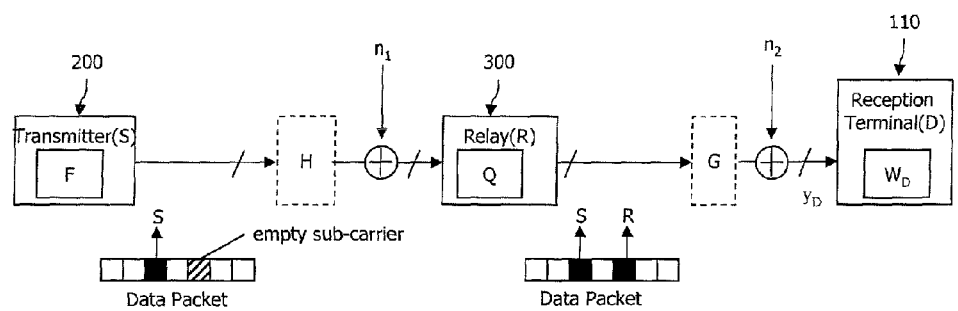
FIG. 3 is a drawing illustrating a system illustrated in FIG. 2 as a matrix model.

As can be seen with reference to FIG. 3, it may be considered that the transmitter 200 has an F filter, the relay 300 has a Q filter, and the reception terminal 110 has a $W_D$ filter.

A signal transmitted by the transmitter 200 passes through (or experiences) the channel H, is added with noise n1, and then, reaches the relay 300. A signal transmitted by the relay 300 passes through the channel G, is added with noise n2, and then, reaches the reception terminal 110.

In this case, in order for the reception terminal 110 to decode the received signal, in the related art, the reception terminal 110 should know both the channel H and the channel G as mentioned above.

To this end, as shown in FIG. 3, when the transmitter 200 transmits am empty subcarrier, as well as a subcarrier for its pilot, the relay 300 carries its pilot signal in the position of the empty subcarrier of the relay 300 and transmits the same.

Then, the reception terminal 110 estimates the channel H between the transmitter 200 and the relay 300 through the pilot signal of the transmitter 200.

However, such a scheme wastes radio resource as mentioned above.

In another aspect, when the relay 300 performs amplifying, it amplifies also a noise component in the pilot signal of the transmitter 200, so the reception terminal 110 has difficulty in accurately recognizing the channel H between the transmitter 200 and the relay 300.

Figure 4:
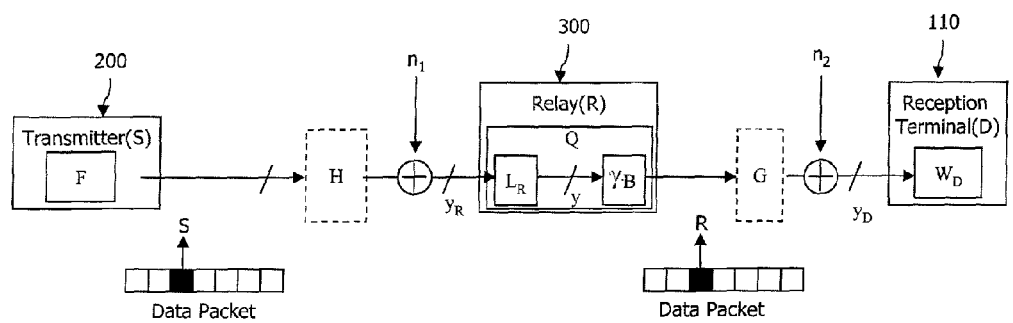
FIG. 4 is a drawing illustrating a system according to the first embodiment of the present invention as a matrix model.

Hereinafter, FIG. 4 shows a relay scheme according to a first embodiment of the present invention allowing the reception terminal 110 to estimate only the channel G.

FIG. 4 is a drawing illustrating a system according to the first embodiment of the present invention as a matrix model.

As can be seen with reference to FIG. 4, it may be considered that the transmitter 200 has the F filter, the relay 300 has an $L^R$ filter and a $\gamma B$ filter, which are Q filters, and the reception terminal 110 has a $W_D$ filter.

A signal transmitted by the transmitter 200 passes through the channel H, is added with noise n1 into a yR signal, and then, the yR signal reaches the relay 300. A signal transmitted by the relay 300 passes through the channel G, is added with noise n2 into a yD signal, and then, the yD signal reaches the reception terminal 110.

Here, SVD (Singular Value Decomposition) of each channel is defined as follows.

$$H = Y_h \Phi V_h^H \quad \text{[Equation 4]}$$

$$G = U_g \Omega V_h^H$$

$$\Phi \triangleq \text{diag}\{\phi_1, \phi_2, \ldots, \phi_{N_S}\}$$

$$\Omega \triangleq \text{diag}\{\omega_1, \omega_2, \ldots, \omega_{N_S}\}$$

An optimal design among the transmitter, the relay, and the reception terminal (Source-Relay-Destination Joint Optimal Design) is as follows.

It can be demonstrated that an optimal relay filter $\hat{Q}$ has the following form by using a convex optimization theory.

$$\hat{Q} = \gamma B L_R \quad \text{[Equation 5]}$$

$$\gamma = \sqrt{\frac{P_R}{tr\{BL_R(\sigma_x^2 HFF^H H^H + \sigma_{n_1}^2 I)L_R^H B^H\}}}$$

$$B = G^H W_D^H \left(W_D G G^H W_D^H + \frac{tr\{W_D R_{n_2} W_D^H\}}{P_R} I\right)^{-1}$$

$$L_R = \left(F^H H^H HF + \frac{\sigma_{n_1}^2}{\sigma_x^2} I\right)^{-1} F^H H^H$$

Here, B and $L_R$ correspond to transmit Wiener filter and receive Wiener filter (R-WF), respectively. $\gamma$ and $P_R$ indicate Relay power normalizing constant and transmit power of the entire relays, respectively.

When the results are used, an existing error matrix $R_E$ may be indicated by the sum of two individual error matrices.

$$R_E = \left(\gamma^2 F^H H^H L_R^H B^H G^H R_n^{-1} GBL_R HF + \frac{1}{\sigma_x^2} I\right)^{-1} \quad \text{[Equation 6]}$$

$$= \sigma_{n_1}^2 \left(F^H H^H HF + \frac{\sigma_{n_1}^2}{\sigma_x^2} I\right)^{-1} +$$

$$\frac{\sigma_{n_2}^2}{\gamma^2}\left(B^H G^H GB + \frac{\sigma_{n_2}^2}{\gamma^2} R_y^{-1}\right)^{-1}$$

Meanwhile, problem formulation is given as follows.

$$\{\hat{F}, \hat{B}\} = \operatorname*{argmin}_{\{F,B\}} tr\left\{\sigma_{n_1}^2\left(F^H H^H HF + \frac{\sigma_{n_1}^2}{\sigma_x^2} I_{N_S}\right)^{-1} + \right. \quad \text{[Equation 7]}$$

$$\left. \sigma_{n_2}^2(B^H G^H GB + \sigma_{n_2}^2 R_y^{-1})^{-1}\right\}$$

s.t. $tr\{\sigma_x^2 FF^H\} = \sigma_x^2 N_S$ and $tr\{BL_R R_y L_R^H B^H\} = P_R$ Here, because it is assumed that relay power normalizing constant $\gamma$ is included in relay pre-coder B, it may be left such that $\gamma = 1$. $R_y$ may be defined as follows.

$$R_y \triangleq E[yy^H] \quad \text{[Equation 8]}$$

$$= \sigma_x^2 F^H H^H HF\left(F^H H^H HF + \frac{\sigma_{n_1}^2}{\sigma_x^2} I_{N_S}\right)^{-1}$$

In an actual situation, $(\sigma_x^2 \gg \sigma_{n_1}^2)$, $R_y$ may be approximated to identity matrix $(\sigma_x^2 I)$.

Thus, problem formulation may be corrected as follows.

[Equation 9]

$$\hat{F} = \operatorname*{argmin}_F tr\left\{\sigma_{n_1}^2\left(F^H H^H HF + \frac{\sigma_{n_1}^2}{\sigma_x^2} I_{N_S}\right)^{-1}\right\} \quad \text{s.t.} \quad tr\{\sigma_x^2 FF^H\} = \sigma_x^2 N_S$$

$$\hat{B} = \operatorname*{argmin}_B tr\{\sigma_{n_2}^2(B^H G^H GB + \sigma_{n_2}^2 R_y^{-1})^{-1}\} \quad \text{s.t.} \quad tr\{BL_R R_y L_R^H B^H\} = P_R$$

Thus, it may be assumed that $\hat{F}$ and $\hat{B}$ have the following form.

$$\hat{F} = \overline{V}_h \Delta_f \quad \text{[Equation 10]}$$

$$\hat{B} = \overline{V}_g \Delta_b$$

$$\Delta_f = \text{diag}\{f_1, f_2, \ldots, f_{N_S}\}$$

$$\Delta_b = \text{diag}\{b_1, b_2, \ldots, b_{N_S}\}$$

When these are substituted to the above problem, the following closed form solution can be obtained, and this solution is a solution optimized for high SNR (Signal-to-Noise Ratio).

$$|f_i|^2 = \frac{1}{\sigma_x^2 \phi_i^2}\left(\sqrt{\frac{\sigma_{n_1}^2 \sigma_x^2 \phi_i^2}{\mu}} - \sigma_{n_1}^2\right)^+ \quad \text{[Equation 11]}$$

$$|b_i|^2 = \frac{1}{r_i \omega_i^2}\left(\sqrt{\frac{\sigma_{n_2}^2 r_i \omega_i^2}{\nu}} - \sigma_{n_2}^2\right)^+$$

Here, $r_i$ is ith diagonal element of $R_y$.

Meanwhile, when a receiver of the reception terminal 110 uses an optimal relay filter formula $\hat{Q} = \gamma BL_R$, namely, a receiver Wiener filter (R-WF), $\tilde{W}_D$ may be corrected as follows.

$$\hat{W}_D = \gamma(F^H H^H Q^H G^H R_n^{-1} GQHF + R_x^{-1})^{-1} \quad \text{[Equation 12]}$$

$$F^H H^H Q^H G^H R_n^{-1}$$

$$= \left(B^H G^H GB + \frac{\sigma_{n_2}^2}{\gamma^2} R_y^{-1}\right)^{-1} B^H G^H$$

As mentioned above, since $R_y$ is approximated to identity matrix $(\sigma_x^2 I)$ in an actual situation, $\tilde{W}_D$ may be approximated as follows.

$$\tilde{W}_D = \left(B^H G^H GB + \frac{\sigma_{n_2}^2}{\sigma_x^2} I_{N_x}\right)^{-1} B^H G^H \quad \text{[Equation 13]}$$

When the above $\tilde{W}_D$ is used, information regarding a first channel H is not required, unlike the case of $\hat{W}_D$.

In the case of $\tilde{W}_D$, it is approximated to optimal in a high SNR ($\sigma_x^2 \gg \sigma_{n_1}^2$) and it can be confirmed through simulation results that performance is not greatly degraded even in the low SNR region in comparison to an optimal case.

Meanwhile, as can be seen from FIG. 4, the relay 300 estimates a channel with respect to the transmitter 200 through pilot of the transmitter 200 in a received subcarrier. And, the relay 300 removes (punctures) the pilot of the transmitter 200, amplifies a signal from which the pilot of the transmitter 200 has been removed according to the estimated channel, includes the pilot of the relay 300 in the punctured position, and transmits the same to the reception terminal 110. In this case, the position of the pilot signal of the transmitter 200 and that of the pilot signal of the relay 300 may be the same. Or, the position of the pilot signal of the transmitter 200 and that of the pilot signal of the relay 300 may be different. For example, when the pilot signal of the transmitter 200 is at the third position, next data may be shifted to be positioned at the third position from which the pilot signal was removed. And, the pilot signal of the relay 300 may be included at a sixth position.

As can be seen from above, in the AF scheme according to the first embodiment of the present invention, the reception terminal 110 may estimate only the channel G between the relay 300 and the reception terminal 100 and does not need to estimate the channel H between the relay 300 and the transmitter 200. Also, without the necessity of consuming two pilots and subcarriers, only one pilot signal and subcarrier are used, the efficiency of radio resource can be increased.

Figure 5:
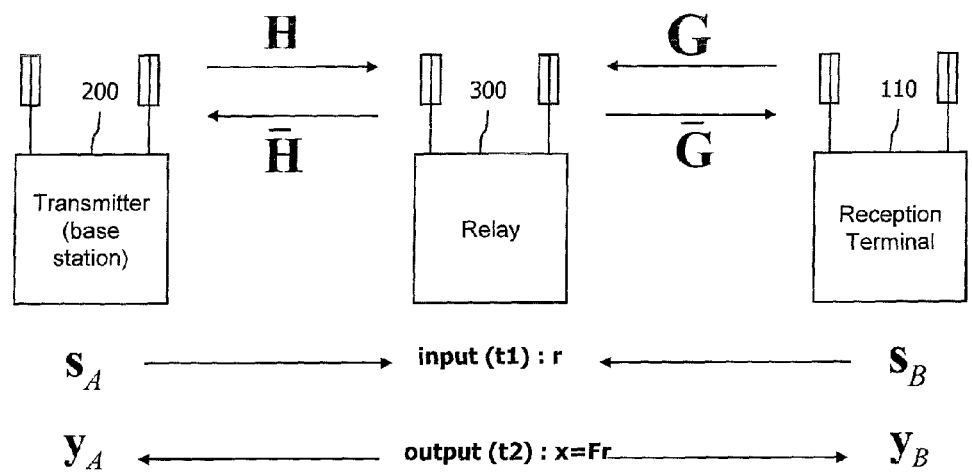
FIG. 5 is a drawing illustrating a data relay process according to a second embodiment of the present invention in a MIMO type two-way multi-input multi-output relay system.

FIG. 5 is a drawing illustrating a data relay process according to a second embodiment of the present invention.

As shown in FIG. 5, the transmitter (i.e., base station) 200, the relay 300, and the reception terminal 110 include multiple antennas, respectively, and are available for MIMO. Also, the relay performs relaying through two-way multi-input multi-output technique.

As can be seen with reference to FIG. 5, it is assumed that a forward channel from the transmitter (i.e., base station) 200 to the relay 300 is H, a reverse channel from the transmitter (i.e., base station) 200 to the relay 300 is $\overline{H}$, a forward channel from the reception terminal 110 to the relay 300 is G, a reverse channel from the reception terminal 110 to the relay 300 is $\overline{G}$, and a filter of the relay 300 is F.

First, a data relay process when it is assumed that both of the transmitter (i.e., base station) 200 and the reception terminal 110 have a function of removing self-interference will be described.

As illustrated in FIG. 5, the relay 300 capable of performing MIMO type two-way relay communication simultaneously receive $S_A$ and $S_B$ from the transmitter (i.e., base station) 200 and the reception terminal 110, respectively at a first time t1, and simultaneously transfers signal x (x=Fr) obtained by filtering the signals received from the transmitter (i.e., base station) 200 and the reception terminal 110 to the base station and the terminal at a second time (t2).

At this time, when signals received by the transmitter (i.e., base station) 200 and the reception terminal 110 are $y_A$ and $y_B$, the signal $y_A$ received by the transmitter (i.e., base station) 200 is represented by following Equation 14.

$$y_A = \gamma \overline{H}FHs_A + \gamma \overline{H}FCs_B + \gamma \overline{H}Fn + z_A \quad \text{[Equation 14]}$$

With reference to Equation 14, a first signal component $\gamma \overline{H}FHs_A$ of the signal $y_A$ received by the transmitter (i.e., base station) 200 is a signal component that the signal $S_A$ transmitted by the transmitter (i.e., base station) 200 at the time t1 has been returned to the transmitter (i.e., base station) 200, and it corresponds to a self-interference signal of the base station. Since it is assumed that the transmitter (i.e., base station) 200 has self-interference signal removal capability, the transmitter (i.e., base station) 200 can remove the self-interference signal component $\gamma \overline{H}FHs_A$ by itself. In the above Equation 14, $\gamma$ corresponds to a power adjustment constant value of the relay 300.

A second signal component $\gamma \overline{H}FGs_B$ in Equation 14 corresponds to a target signal component that the signal $S_B$ transmitted by the reception terminal 110 has been relayed by the relay 300 and transferred to the transmitter (i.e., base station) 200.

A third signal component $\gamma \overline{H}Fn$ in Equation 14 corresponds to a signal component that a channel noise component generated in the relay 300 has been transferred. A fourth signal component $z_A$ in Equation 14 corresponds to a noise component generated in the transmitter (i.e., base station) 200 by itself at the time t2.

Meanwhile, the signal $y_B$ received by the reception terminal 110 during t2 is represented by following Equation 15.

$$y_B = \gamma \overline{G}FHs_A + \gamma \overline{G}FGs_B + \gamma \overline{G}Fn + z_B \quad \text{[Equation 15]}$$

With reference to Equation 15, in the signal $y_B$ received by the reception terminal 110, a first signal component $\gamma \overline{G}FHs_A$ corresponds to a target signal component that the signal $S_A$ transmitted by the transmitter (i.e., base station) 200 has been relayed by the relay 300 and transferred to the reception terminal 110.

Also, a second signal component $\gamma \overline{G}FGs_B$ in Equation 15 is a signal component that the signal $S_B$ which was transmitted by the reception terminal 110 has been returned to the reception terminal 110, and corresponds to a self-interference signal. Since it is assumed that the reception terminal 110 has self-interference signal removal capability, the reception terminal 110 can remove the self-interference signal component $\gamma \overline{G}FGs_B$ by itself.

Also, a third signal component $\gamma \overline{G}Fn$ in Equation 15 corresponds to a channel noise component, and a fourth signal component $z_B$ in Equation 15 corresponds to a noise component generated in the reception terminal 110 itself at the time t2.

Thus, when the transmitter (i.e., base station) 200 and the reception terminal 110 remove the self-interference signal components, the signals $y_A$ and $y_B$ received by the transmitter (i.e., base station) 200 and the reception terminal 110 are represented by following Equation 16.

$$y_A = \gamma \overline{H}FGs_B + \gamma \overline{H}Fn + z_A$$

$$y_B = \gamma \overline{G}FHs_A + \gamma \overline{G}Fn + z_B \quad \text{[Equation 16]}$$

In this case, when the relay 300 relays data according to a simple amplifying (AF) scheme, the relay 300 filter F in the MIMO type two-way multi-input multi-output relay system can be represented by following Equation 17, which is a scalar multiplication or a constant multiplication of identity matrix I.

$$F = \gamma I \quad \text{[Equation 17]}$$

Meanwhile, when the reception terminal 110 does not have the function of removing self-interference, the signals $y_A$ and $y_B$ received by the transmitter (i.e., base station) 200 and the reception terminal 110 in Equation 3 may be represented by following Equation 18.

$$y_A = \gamma \overline{H}FGs_B + \gamma \overline{H}Fn + z_A$$

$$y_B = \gamma \overline{G}FHs_A + \gamma \overline{G}FGs_B + \gamma \overline{G}Fn + z_B \quad \text{[Equation 18]}$$

As shown in Equation 18, the reception terminal 110 cannot remove the $\gamma\overline{G}FGs_B$ signal corresponding to the self-reference signal, so the self-reference signal component of the reception terminal 110 is removed through optimization design of the relay 300 filter F proposed in the second embodiment of the present invention, thus optimizing two-way relay communication.

Hereinafter, a signal processing method for removing a self-interference signal of the terminal through optimization of the filter F in the relay 300 will be described in detail.

The signals received by the transmitter (i.e., the base station) 200 before removing the self-interference signal in the two-way relay type channel as described above may be represented by a determinant as shown in following Equation 19.

$$\begin{bmatrix} y_B \\ y_A \end{bmatrix} = \gamma \begin{bmatrix} \overline{G} \\ \overline{H} \end{bmatrix} [F][G\ H] \begin{bmatrix} s_B \\ s_A \end{bmatrix} + \quad \text{[Equation 19]}$$

$$\gamma \begin{bmatrix} \overline{G} \\ \overline{H} \end{bmatrix} [F][n] + \begin{bmatrix} z_B \\ z_A \end{bmatrix}$$

$$= \gamma \begin{bmatrix} \overline{G}FG & \overline{G}FH \\ \overline{H}FG & \overline{H}FH \end{bmatrix} \begin{bmatrix} s_B \\ s_A \end{bmatrix} + \begin{bmatrix} \gamma\overline{G}Fn + z_B \\ \gamma\overline{H}Fn + z_A \end{bmatrix}$$

In equation 19, when it is defined that $A=[H\ G]$, $B=[\overline{G}\ \overline{H}]^T$, the relay 300 filter F should be designed to remove the self-interference signal channel $\overline{G}FG$ of the reception terminal 110 in a effective channel appearing in the reception terminal. In this case, the effective channel appearing in the reception end is defined by BFA and expressed by determinant $$\begin{bmatrix} \overline{G}FG & \overline{G}FH \\ \overline{H}FG & \overline{H}FH \end{bmatrix}$$

of Equation 19.

According to a modification of the second embodiment, the relay filter F configures the effective channel appearing in the reception end by a right lower triangular matrix as represented by following Equation 20.

$$BFA = \begin{bmatrix} \overline{G}FG & \overline{G}FH \\ \overline{H}FG & \overline{H}FH \end{bmatrix} = \begin{bmatrix} 0 & \diagup \\ \diagup & \end{bmatrix} \quad \text{[Equation 20]}$$

Thus, the relay filter F proposed in the second embodiment is given as shown in following Equation 21.

$$F = Q_B X Q_A^H \quad \text{[Equation 21]}$$

In Equation 21, X indicates a substitution matrix as represented by following Equation 22.

$$X = \begin{bmatrix} & & 1 \\ & \cdots & \\ 1 & & \end{bmatrix} \quad \text{[Equation 22]}$$

Also, $Q_A$ and $Q_B$ in Equation 21 may be obtained from OR decomposition extended based on MMSE (Minimum Mean-Square Error) as shown in following Equation 23.

$$\begin{bmatrix} [H\ G] \\ \frac{1}{\rho_A} I_{2M} \end{bmatrix} = \overline{Q}_A R_A, \quad \text{[Equation 23]}$$

$$\left[\begin{bmatrix} \overline{G} \\ \overline{H} \end{bmatrix}\ \frac{1}{\rho_R} I_{2M} \right]^H = \overline{Q}_B R_B$$

In Equation 23, $\rho$ is an SNR (Signal to Noise Ratio) value, and a first N×N submatrix of $\overline{Q}_A$ and $\overline{Q}_B$ is used as $Q_A$ and $Q_B$, respectively.

According to the modification of the second embodiment of the present invention, the relay filter F configures the effective channel appearing in the reception end, as a right lower block triangular matrix as shown in following Equation 24.

$$BFA = \begin{bmatrix} \overline{G}FG & \overline{G}FH \\ \overline{H}FG & \overline{H}FH \end{bmatrix} = \begin{bmatrix} 0 & \\ & \end{bmatrix} \quad \text{[Equation 24]}$$

Thus, the relay filter F proposed in the modification of the second embodiment is given as represented by following Equation 25.

$$F = V_{\overline{G}} X U_G^H \quad \text{[Equation 25]}$$

In Equation 25, the unitary matrix $U_{\overline{G}}$ and $V_{\overline{G}}$ may be calculated through singular value decomposition (SVD) of the channels G and $\overline{G}$ associated with the reception terminal, as represented by following Equation 26.

$$G = U_G \Sigma_G V_G^H,\ \overline{G} = U_{\overline{G}} \Sigma_{\overline{G}} V_{\overline{G}}^H \quad \text{[Equation 26]}$$

Also, the substation matrix X is given to be the same as that of the above-described Equation 22.

The relay filter F according to the modification of the second embodiment uses only the information of the channels G and $\overline{G}$ associated with the reception terminal 110. Thus, in an actual implementation, the relay filter F according to the modification of the second embodiment can obtain it although there is no channel information regarding a channel connected to the transmitter (i.e., base station) 200, overhead of the entire system can be reduced.

Figure 6:
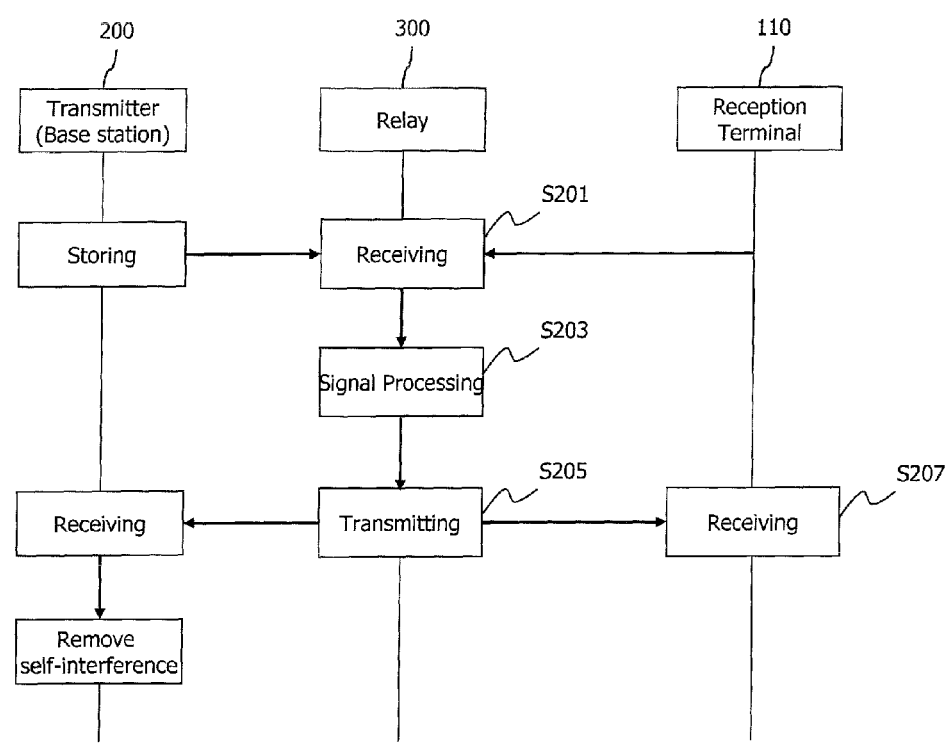
FIG. 6 is a drawing illustrating a sequential data relay process according to the second embodiment of the present invention in the relay system.

FIG. 6 is a drawing illustrating a sequential data relay process according to the second embodiment of the present invention in the relay system.

The reception terminal 110 informs the relay 300 or the transmitter (i.e., base station) 200 as to whether or not it has a self-interference removal capability beforehand, and according to circumstances, in order for the transmitter (i.e., base station) 200 to determine a relay filter for a two-way relay operation utilizing particular resource at a particular point in time of the relay 300, the transmitter may inform the relay 300 as to whether or not the reception terminal 110 participating in the corresponding two-way relay operation has self-interference removing capability.

The relay 300 receives $S_A$ and $S_B$ from the transmitter (i.e., base station) 200 and the reception terminal 110, respectively, at the first time t1 (S201).

The relay 300 processes the received signal through the designed filter F to remove a self-interference signal of the terminal (S203).

In this case, in processing the signal for removing the self-interference signal of the terminal, as described above through Equation 7 and Equation 11, the signal is filtered through the filter F designed such that the self-interference signal channel $\overline{G}FG$ of the terminal has a null value in the effective channel appearing in the reception end. In the method of processing the self-interference signal channel $\overline{G}FG$ of the terminal to have the null value, the effective channel appearing in the reception end may be configured as a right lower triangular matrix or a right lower block triangular matrix.

After the self-interference signal of the terminal is removed through the filter F of the relay 300, the relay 300 transfers the processed signal to the transmitter (i.e., base station) 200 and the reception terminal 110, respectively, (S205).

In this case, since the relay 300 is available for MIMO (Multiple Input Multiple Output) type two-way relay, it can simultaneously receive signals from the transmitter (i.e., base station) 200 and the reception terminal or simultaneously transmit signals thereto.

The reception terminal 110 without the self-interference removal function receives the signal filtered from which the self-interference signal component of the terminal was removed (S207), and in this case, the signal $y_B$ received by the reception terminal 110 is represented by following Equation 27.

$$y_B = \gamma \overline{G}FHs_A + \gamma \overline{G}Fn + z_B \quad \text{[Equation 27]}$$

Thereafter, the reception terminal 110 removes a channel noise component and a noise component generated in the terminal, and decodes the signal $s_A$ transmitted from the transmitter (i.e., base station) 200.

In case of the transmitter (i.e., base station) 200, since it has the function of removing a self-interference signal, the signal $y_A$ transferred from the relay 300 is represented by Equation 1 as described above.

Thus, the transmitter (i.e., base station) 200 is required to store the signal $s_A$ which has been transmitted to the relay 300 at the time t1, and the transmitter (i.e., base station) 200 can remove the self-interference signal component by utilizing the stored signal.

According to a different embodiment of the present invention, although the reception terminal 110 supports the self-interference removal function, whether to perform the self-interference operation of the terminal may be adaptively determined according to a situation and filter signal processing for relaying of the relay 300 may be adaptively performed accordingly.

Thus, when the reception terminal 110 detects a transmitted signal by utilizing particular resource at a particular time, the transmitter (i.e., base station) 200 or the relay 300 may transmit a signal indicating whether to perform the self-interference removal operation of the terminal to the reception terminal 110.

Or, in order to reduce overhead of the signal, the transmitter (i.e., base station) 200 or the relay 300 may semi-statically set by a higher layer signal whether to perform a self-interference removal operation when a particular terminal detects a signal.

The relay 300 may adaptively perform the two-way relay operation according to whether or not the terminal supports and activates the self-interference removal function between the base station and the terminal on the basis of the signal exchange as described above.

Through the adaptive operation, the relay 300 can differently perform relay filter design according to whether or not the terminal can remove self-interference and whether or not the self-interference removal operation of the reception terminal 110 is activated at a particular point in time.

As described above, unlike the existing two-way relay scheme, the proposed two-way relay scheme is on the assumption that the reception terminal 110 does not have a self-interference removal function, so it has an advantage that a legacy terminal can be used as it is.

In the proposed scheme, the relay 300 removes the self-interference signal appearing in the reception terminal, so a great performance improvement can be expected in comparison to the application of the existing relay scheme as it is.

Figure 7:
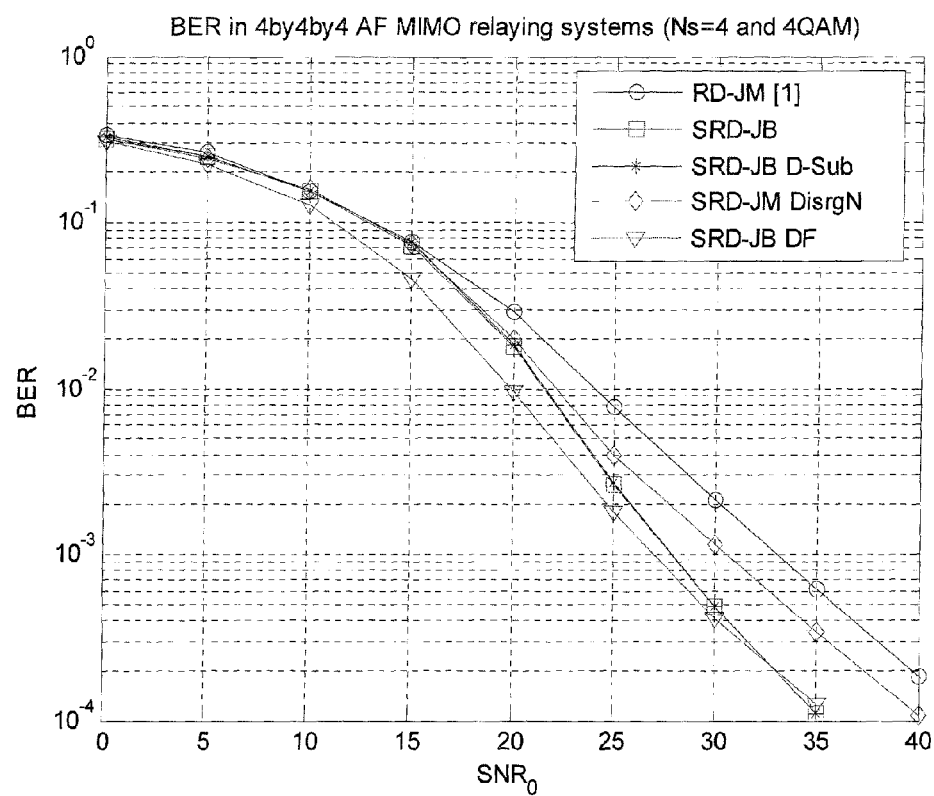
FIG. 7 is a drawing illustrating PER performance results of 4QAM constellation model based on the AF scheme according to the first embodiment of the present invention.
Figure 8:
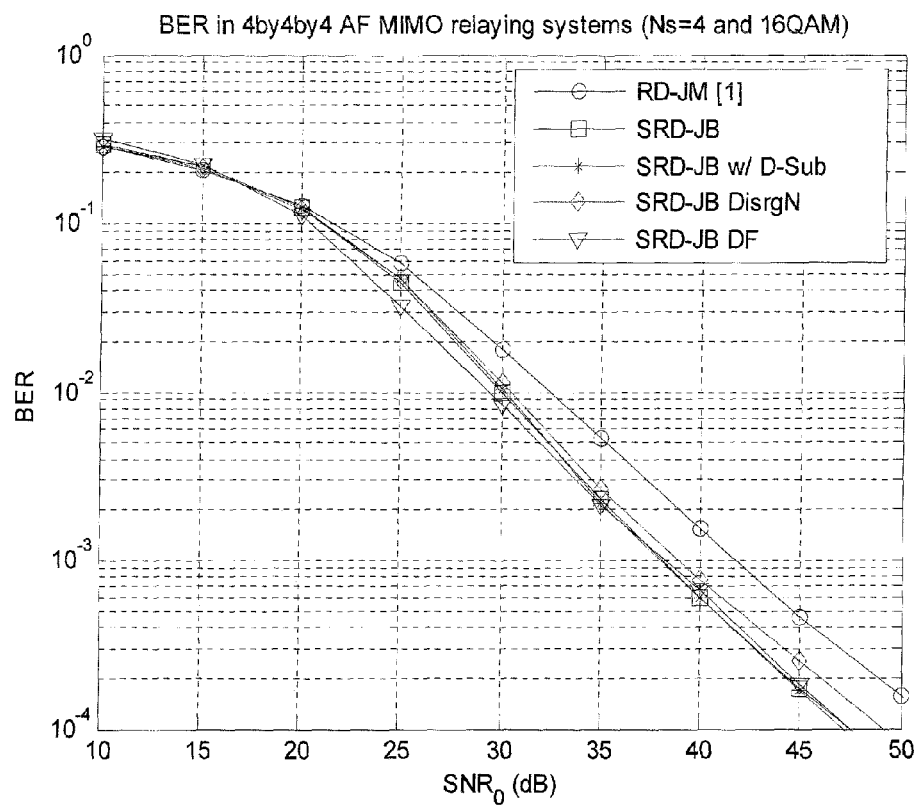
FIG. 8 is a drawing illustrating the results of 16QAM constellation model based on the AF scheme according to the first embodiment of the present invention.
Figure 9:
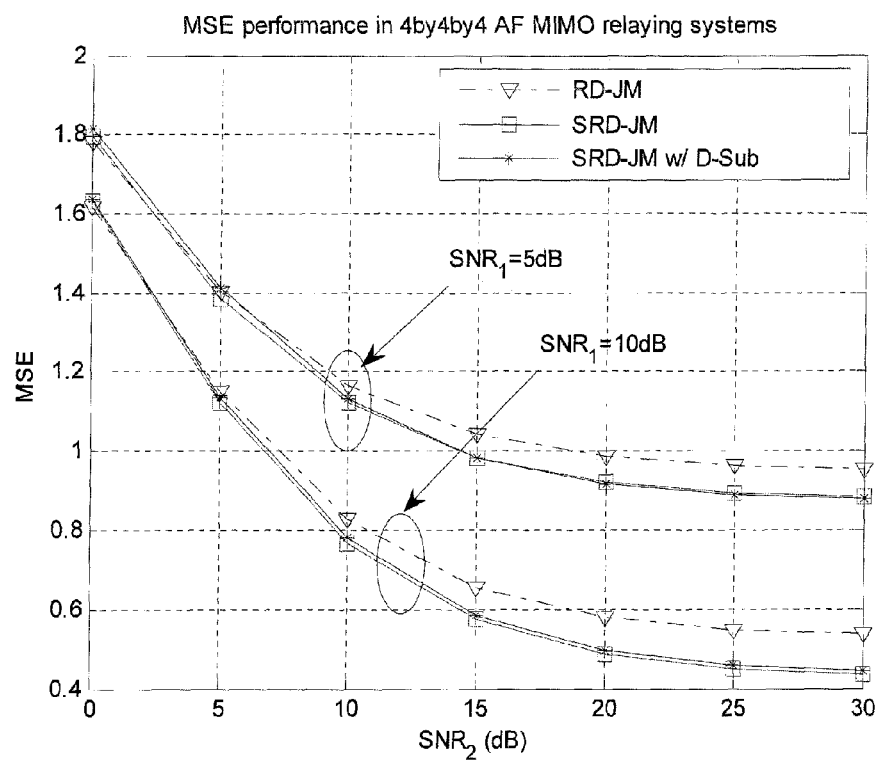
FIG. 9 is a drawing illustrating gains of the AF scheme according to an MSE (Mean Squared Error) according to the first embodiment of the present invention.

FIG. 7 is a drawing illustrating PER performance results of 4QAM constellation model based on the AF scheme according to the first embodiment of the present invention. FIG. 8 is a drawing illustrating the results of 16QAM constellation model based on the AF scheme according to the first embodiment of the present invention. FIG. 9 is a drawing illustrating gains of the AF scheme according to an MSE (Mean Squared Error) according to the first embodiment of the present invention.

As can be seen with reference to FIG. 7, the amplify and forward scheme (SRD-JB) according to the first embodiment of the present invention does not have a degradation of the related art scheme (RD-JM) performance. Also, although the reception terminal 110 uses a D-sub filter for estimating only the channel G, the performance is not degraded.

Namely, the scheme proposed in the first embodiment can achieve optimum performance although the relay 300 and the reception terminal 110 know only the channel information corresponding to them, respectively.

Also, the illustrated SRD-JB DisrgN is a case in which the reception terminal 110 knows only the channel ($\gamma$GBL$_R$HF) through one pilot signal, which corresponds to a case in which detection is performed regardless of noise n1 of the relay 300 on the assumption of $\sigma_x^2 \gg \sigma_{n_1}^2$. Also, SRD-JB DF is the simulation results obtained according to the DF scheme in the relay 300. A joint MMSE (ARITH-BER) scheme in the conventional point-to-point MIMO scheme was applied with respect to each of the channel H and the channel G.

With reference to FIG. 8, results in 16 QAM are shown, and the scheme proposed in the first embodiment of the present invention has no connection with a modulation-level.

Also, FIG. 9 shows gains in the MSE (Mean Squared Error), in which there is little performance degradation even in case of using D-Sub.

Figure 10:
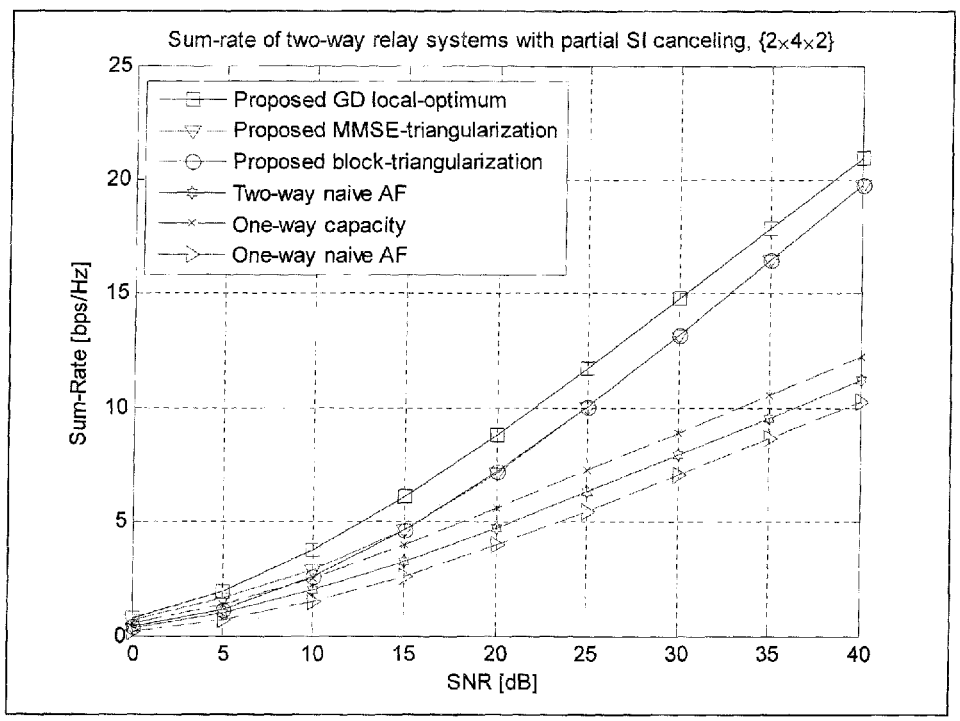
FIG. 10 is a graph showing comparison between sum-rate performance of the conventional art and sum-rate performance according to the second embodiment of the present invention when it is assumed that the number of antennas of a relay 300 is 4.

FIG. 10 is a graph showing comparison between sum-rate performance of the conventional art and sum-rate performance according to the second embodiment of the present invention when it is assumed that the number of antennas of a relay 300 is 4.

In FIG. 10, when it is assumed that the numbers of antennas of the transmitter (i.e., base station) 200, the relay 300, and the reception terminal 110 are 2, 4, and 2, respectively, the sum-rate of the filter signal processing scheme of the related art relay and the sum-rate of the signal processing scheme through the relay filter of two schemes proposed in the second embodiment of the present invention were compared.

With reference to the graph of FIG. 10, the MMSE (Minimum Mean-Square Error)-triangularization filter according to the second embodiment of the present invention and the block-triangularization filter (filter F according to the modification of the second embodiment) have improved performance in comparison to the sum-rate obtained through the related art two-way naïve AF type filter.

Also, compared to the maximum capacity of the related art on-way scheme, it can be confirmed that the filter according to the second embodiment obtains a greater performance gain.

A theoretical maximum value of the sum-rate performance is a GD (gradient descent) technique, one of widely known optimization schemes, but with reference to the performance comparison graph of FIG. 10, it can be confirmed that the two types of relay filter methods proposed in the second embodiment of the present invention are considerably close to the performance maximum value obtained by using the GD. However, with the GD technique, the filter should be implemented through repeated calculation, having very high complexity, so there is a difficulty in actual implementation. However, the two types of filter techniques proposed in the second embodiment of the present invention can be applied through a simple closed-form calculation in the relay.

Also, in the case of the proposed block-triangularization filter technique, only channel information associated with a terminal is required as channel information for calculating a relay filter, having an advantage in that the system overhead can be relatively reduced.

Figure 11:
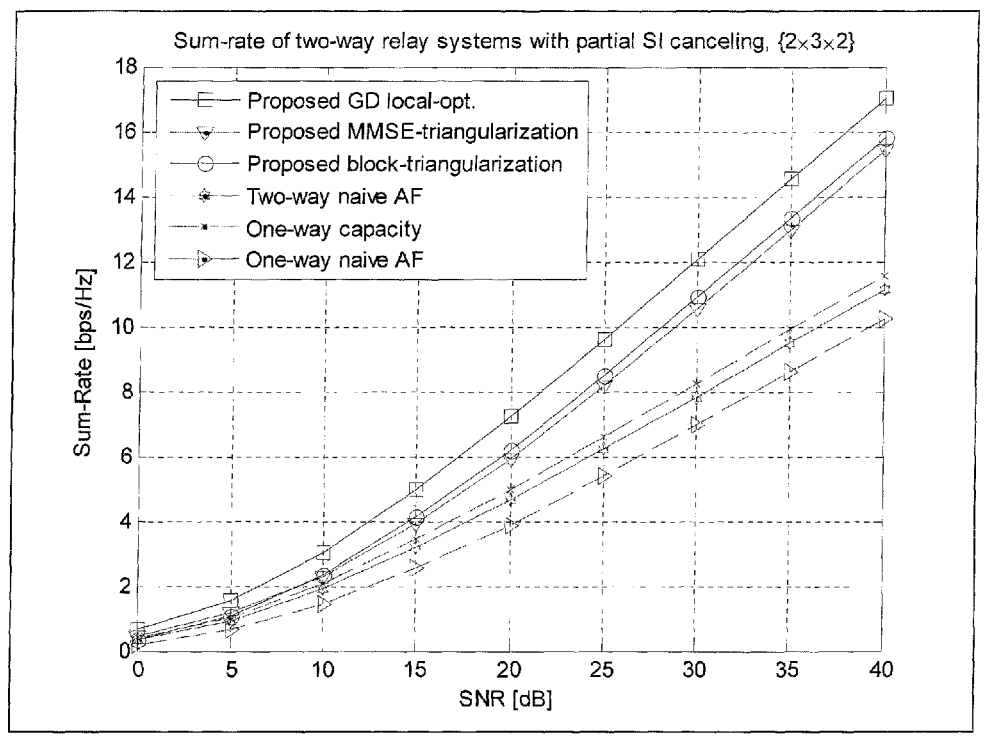
FIG. 11 is a graph showing comparison between sum-rate performance of the conventional art and sum-rate performance according to the second embodiment of the present invention when it is assumed that the number of antennas of a relay 300 is 3.

FIG. 11 is a graph showing comparison between sum-rate performance of the conventional art and sum-rate performance according to the second embodiment of the present invention when it is assumed that the number of antennas of a relay 300 is 3.

In the performance comparison graph of FIG. 11, the sum-rate was compared when the numbers of the antennas of the transmitter (i.e., base station) 200, the relay 300, and the reception terminal 110 are 2, 3, and 2, respectively. The performance according to the two types of schemes proposed in the second embodiment of the present invention is similar to the performance comparison results of FIG. 10a, and thus, it can be confirmed that the sum-rate gain of the proposed schemes is excellent.

The method described so far according to embodiments of the present invention may be implemented as software, hardware or a combination thereof. For example, the method according to exemplary embodiments of the present invention may be stored in a storage medium (e.g., an internal memory, a flash memory, a hard disk, or the like), and may be implemented by codes or commands in a software program that can be executed by a processor (e.g., a microprocessor).

The embodiments has been illustratively described, but it should be understood that the description of the invention is not intended to restrict the invention to specific forms of the present invention but rather the present invention is meant to cover all modifications, similarities and alternatives which are included in the spirit and scope of the present invention.

According to the AF method according to the first embodiment of the present invention, the receiver estimates only the channel of the relay, thus reducing complexity. Also, according to the AF method according to the first embodiment of the present invention, since a pilot signal is used one time, radio resource can be effectively utilized. In addition, according to the AF method according to the first embodiment of the present invention, performance is not degraded while a pilot signal is used only one time.

According to the second embodiment of the present invention, the MIMO (Multiple Input Multiple Output) type two-way relay supporting data relaying even for a terminal that does not have a self-interference removal function is provided.

Also, according to the second embodiment of the present invention, since there is no need to add the self-interference removal function to a terminal, an existing legacy terminal can be used as it is in a system.

In addition, according to the second embodiment of the present invention, since the terminal can be applied to a relay system although it does not have a self-interference removal function, complexity of the terminal can be reduced.

Description will now be given in detail of a drain device and a refrigerator having the same according to an embodiment, with reference to the accompanying drawings.

The invention claimed is:

1. A data relay method in a multi-input multi-output (MIMO) type two-way relay, the method comprising:
    receiving signals $S_A$ and $S_B$ transmitted from a base station and a terminal;
    processing the received signals to relay them to the terminal and the base station; and
    relaying the processed received signals to the base station and the terminal,
    wherein when a forward channel from the terminal to the relay is G, a reverse channel from the terminal to the relay is $\overline{G}$, a power adjustment constant of the relay is $\gamma$, and a filter of the relay is F,
    the signal processing step comprises filtering performed through the filter F such that a self-interference signal component $\gamma \overline{G} F G s_A$ of the terminal generated as the signal $S_A$ is received again by the terminal through the reverse channel $\overline{G}$ of the terminal and the relay is removed.

2. The method of claim 1, wherein when a forward channel from the base station to the relay is H, a reverse channel from the base station to the relay is $\overline{H}$, channel noise is n, and a signal $y_A$ transferred by the base station through the relay and a signal $y_B$ transferred by the terminal through the relay are given by a following equation, $$\begin{bmatrix} y_B \\ y_A \end{bmatrix} = \gamma \begin{bmatrix} \overline{G} \\ \overline{H} \end{bmatrix} [F][G \ H] \begin{bmatrix} s_B \\ s_A \end{bmatrix} + \gamma \begin{bmatrix} \overline{G} \\ \overline{H} \end{bmatrix} [F][n]$$

an effective channel appearing in the base station and the terminal is expressed as $$\begin{bmatrix} \overline{G} \\ \overline{H} \end{bmatrix} [F][G \ H] = \begin{bmatrix} \overline{G}FG & \overline{G}FH \\ \overline{H}FG & \overline{H}FH \end{bmatrix}$$

and the filter F is designed such that a self-interference signal channel $\overline{G}FG$ of the terminal in the effective channel is null.

3. The method of claim 2, wherein the filter F is a minimum mean-square error triangularization filter configured such that a matrix with respect to the effective channel is a right lower triangular matrix.

4. The method of claim 3, wherein, when X is a substitution matrix, $\rho$ is an SNR (signal to Noise Ratio) value, and $Q_A$ and $Q_B$ are obtained from QR decomposition extended based on MMSE (Minimum Mean-Square Error) through $$\begin{bmatrix} [H \ G] \\ \frac{1}{\rho_A} I_{2M} \end{bmatrix} = \overline{Q}_A R_A,$$

-continued $$\left[\begin{bmatrix}\overline{G}\\\overline{H}\end{bmatrix}\frac{1}{\rho_R}I_{2M}\right]^H = \overline{Q}_B R_B,$$

the filter F is configured by a following equation:

$F = Q_B X Q_A^H.$

5. The method of claim 2, wherein the filter F is a block triangularization filter configured such that a matrix with respect to the effective channel is a right lower triangular matrix.

6. The method of claim 5, wherein, when $U_{\overline{G}}$ and $V_{\overline{G}}$ are unitary matrix calculated through singular value decomposition (SVD) of channels G and $\overline{G}$, the filter F is configured by a following equation:

$F = V_{\overline{G}} X U_G^H.$

7. The method of claim 1, wherein the base station has a self-interference removal function and the terminal does not have the self-interference removal function.

8. The method of claim 1, wherein the relay simultaneously receives signals from the base station and the terminal and simultaneously transmits signals to the base station and the terminal.

9. A data relay method in a multi-input multi-output (MIMO) type two-way relay, the method comprising:

receiving information regarding whether or not a terminal supports a self-interference removal function from a base station or the terminal;

receiving signals $S_A$ and $S_B$ transmitted from the base station and the terminal;

processing the received signals to relay them to the terminal and the base station; and relaying the processed received signals to the base station and the terminal, wherein when a forward channel from the terminal to the relay is G, a reverse channel from the terminal to the relay is $\overline{G}$, and a power adjustment constant of the relay is γ, the signal processing step comprises filtering performed through a filter F such that a self-interference signal component $\gamma\overline{G}FGs_A$ of the terminal generated as the signal $S_A$ transmitted by the terminal is received again by the terminal through the reverse channel $\overline{G}$ of the terminal and the relay is removed.

\* \* \* \* \*